Patented Jan. 27, 1931

1,790,272

UNITED STATES PATENT OFFICE

EMIL L. LEASMAN, OF MILWAUKEE, WISCONSIN

COLLOID

No Drawing.   Application filed June 20, 1927.  Serial No. 200,284.

This invention relates to certain new and useful improvements in colloids and the method of producing the same and refers more particularly to a colloid adapted for use as a cleaner, a polisher and binder.

It is an object of this invention to produce a colloid which is free from lumps and which holds its clay in suspension indefinitely.

Another object of this invention is the production of a colloid which may be thinned by adding water or any other suitable fluid to any desired consistency.

And a further object of this invention resides in the production of a colloid which may be used alone or in combination with various ingredients to produce a paste adapted for numerous purposes.

The above described colloid is obtained by mixing a clay known as bentonite with sodium phosphates, using only water as a solvent.

The clay or bentonite, sometimes called Wyoming fire clay or wilkinite, is a composition of silica, alumina, ferric oxide, titania, lime, magnesia, alkalies, sul. trioxide, ignition and water. It is exceedingly fine grained, is highly absorbent, and has remarkable colloidal properties.

The sodium phosphates are known as:

1. Tertiary or tri-sodium phosphate, which has the chemical formula of  $Na_3PO_4.12H_2O$.

2. Secondary or normal sodium phosphate, which has the chemical formula of $$Na_2HPO_4.12H_2O.$$

3. Primary or mono-sodium phosphate, which has the chemical formula of $$NaH_2PO_4.H_2O.$$

In the process of preparing the above described colloid or paste, a saturated or partially saturated solution of the sodium phosphates in water is heated to the boiling point, and the clay or bentonite in a finely ground state is slowly added, the solution being constantly stirred during the addition of the clay and during a period of boiling which is approximately fifteen minutes. This produces a smooth paste or colloid which will hold its clay in suspension indefinitely.

If desired this paste may be strained to produce an extremely smooth product which may be diluted with water or combined with various ingredients for a variety of uses, such as: a binder for foundry purposes, a cleaner for household purposes, a cleaner and polisher for metals, porcelain and the like, for removing carbonaceous substances such as india ink and the like, a cleaner for removing oils and greases from clothing and the like, as a beauty clay and a vehicle for various cosmetics, an ingredient of soap, as an agent in refining of petroleum, as a filler and binder in the manufacture of paper and for deinking of old newspapers and periodicals.

A specific embodiment of the above described colloid consists in adding to one liter of a saturated solution of trisodium phosphate or normal sodium phosphate, small quantities of bentonite which has passed a 40 mesh sieve, at the same time stirring or beating the mixture. The addition of the bentonite continues together with the stirring action until the consistency is that of thick cream. At this stage ten to twenty cubic centimeters of a ten percent solution of commercial soft soap made up in soft water is added. After the soft soap solution has been thoroughly incorporated, the addition of the bentonite in small quantities, with constant stirring or agitation continues until the colloid thus formed has reached the thickness desired. Stirring then continues until the colloid becomes stiff and stands up similar to whipped cream. The weight of the bentonite per liter of saturated sodium phosphate, is about 350 grams.

A modified process of preparing the above described colloid consists of mixing, in its cold state, a saturated or partially saturated solution of trisodium phosphate, or secondary sodium phosphate in water, with a small quantity of potassium soap, a sodium soap or a calcium soap. To this the bentonite in a finely ground state is slowly added with constant stirring. If the colloid is to be used as a cleaning and bleaching agent, a quantity of bisulphite of soda may be added. This addition of the soap produces a particularly smooth paste.

What I claim as my invention is:

1. A colloid consisting of a mixture of finely divided colloidal clay, a sodium phosphate and water.

2. A colloid consisting of a mixture of a saturated solution of sodium phosphate and a quantity of bentonite sufficient to give the mixture a heavy paste-like consistency.

In testimony whereof I hereunto affix my signature.

EMIL L. LEASMAN.